US012808447B2

(12) United States Patent
Roh et al.

(10) Patent No.: US 12,808,447 B2
(45) Date of Patent: Nov. 24, 2026

(54) FUEL CUT-OFF VALVE

(71) Applicant: UNICK CORPORATION, Gimhae-si (KR)

(72) Inventors: Eui-Dong Roh, Busan (KR); Jung-Tae Kim, Busan (KR); Mun-Hak Kim, Busan (KR); Cheol-Soon Park, Gimhae-si (KR); Gyoung Han Noh, Busar (KR)

( * ) Notice: Subject to any disclaimer, the term of this patent is extended or adjusted under 35 U.S.C. 154(b) by 0 days.

(21) Appl. No.: 19/124,282

(22) PCT Filed: Aug. 17, 2023

(86) PCT No.: PCT/KR2023/012160
§ 371 (c)(1),
(2) Date: Apr. 24, 2025

(87) PCT Pub. No.: WO2024/090755
PCT Pub. Date: May 2, 2024

(65) Prior Publication Data

US 2026/0168587 A1 Jun. 18, 2026

(30) Foreign Application Priority Data

Oct. 25, 2022 (KR) ........................ 10-2022-0138329

(51) Int. Cl.
*F16K 24/04* (2006.01)
*B60K 15/03* (2006.01)
(Continued)

(52) U.S. Cl.
CPC ...... *F16K 24/044* (2013.01); *B60K 15/03519* (2013.01); *F02M 37/0023* (2013.01); *B60K 2015/03289* (2013.01)

(58) Field of Classification Search
CPC .. F16K 24/044; F16K 31/408; F16K 31/0655; F16K 31/42; B60K 15/03519; B60K 2015/03289; F02M 37/0023
(Continued)

(56) References Cited

U.S. PATENT DOCUMENTS 5,205,531 A * 4/1993 Kolchinsky ........... F16K 31/408 251/38
6,293,513 B1 * 9/2001 Birkelund ............. F16K 31/408 251/30.03
(Continued)

FOREIGN PATENT DOCUMENTS

CN 111043320 A 4/2020
EP 3647639 A1 5/2020
(Continued)

OTHER PUBLICATIONS

Machine Translation of KR20180113223 retrieved from espacenet.com (Year: 2026).*
(Continued)

*Primary Examiner* — Jessica Cahill

(57) ABSTRACT

Disclosed is a valve including: a housing integrated with a connector for a power source and signal transmission; a coil assembly provided in the housing, and electrically connected to the connector; a core which is coupled to pass through the coil assembly, and which has a first operation groove; a plunger which is movably provided in the first operation groove, and which has a second operation groove connected to the supply path; a friction member interposed between the core and the plunger so as to reduce friction; a pilot which is movably provided in the second operation groove, and which lias a pilot orifice for connecting the second operation groove and the discharge path; and a spring interposed between the core and the plunger so as to
(Continued)

elastically support the plunger, thereby allowing the pilot to come in close contact with the valve seat.

8 Claims, 5 Drawing Sheets

(51) Int. Cl.
*B60K 15/035* (2006.01)
*F02M 37/00* (2006.01)
(58) Field of Classification Search
USPC .................................................... 251/129.01
See application file for complete search history.

(56) References Cited

U.S. PATENT DOCUMENTS

2005/0001183 A1* 1/2005 Hironaka ............ F16K 31/0665
251/50
2011/0308621 A1* 12/2011 Christensen .......... F16K 31/408
137/1
2013/0048896 A1* 2/2013 Stern ..................... F16K 31/408
251/324
2016/0169404 A1* 6/2016 Choi ..................... F16K 31/408
251/129.15
2020/0141515 A1* 5/2020 Iwasaki ............... F16K 31/0655
2022/0305906 A1* 9/2022 Ryu ................. B60K 15/03504

FOREIGN PATENT DOCUMENTS

| | | | |
|---|---|---|---|
| JP | 2006153100 A | 6/2006 | |
| KR | 10-1628569 B1 | 6/2016 | |
| KR | 10-2018-0037649 A | 4/2018 | |
| KR | 10-2018-0113223 A | 10/2018 | |
| KR | 10-2278311 B1 | 7/2021 | |
| KR | 10-2317902 B1 | 10/2021 | |
| WO | WO-03036147 A1 * | 5/2003 | ......... F16K 31/0679 |

OTHER PUBLICATIONS

Machine Translation of KR 102317902 retrieved from espacenet. com. (Year: 2026).*
Extended European search report on PCT/KR2023/012160 mailed on Jan. 2, 2026.
PCT Search Report & Written Opinion on PCT/KR2023/012160 mailed on Jan. 25, 2024.

* cited by examiner

[FIG. 1]
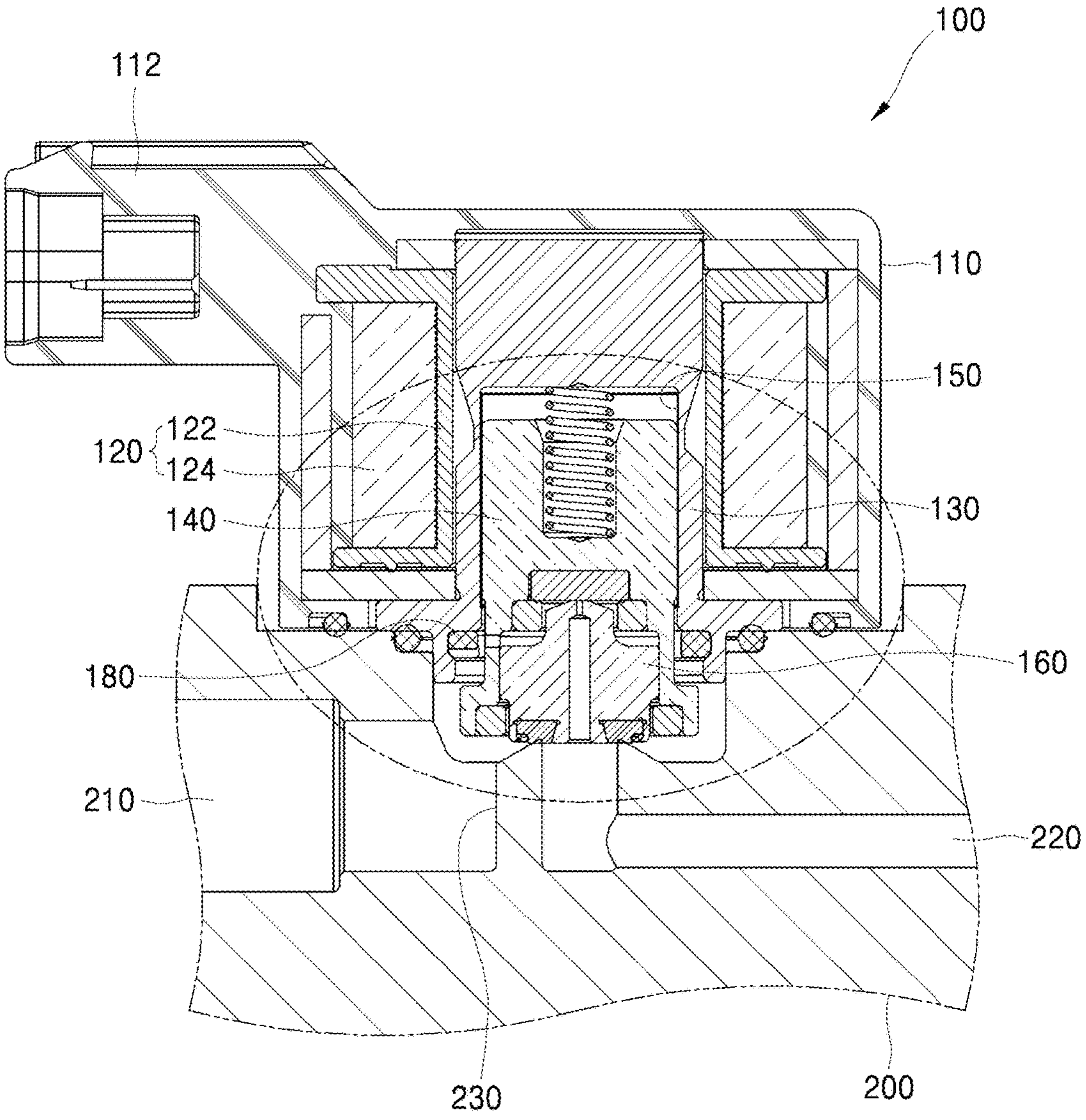

[FIG. 2]
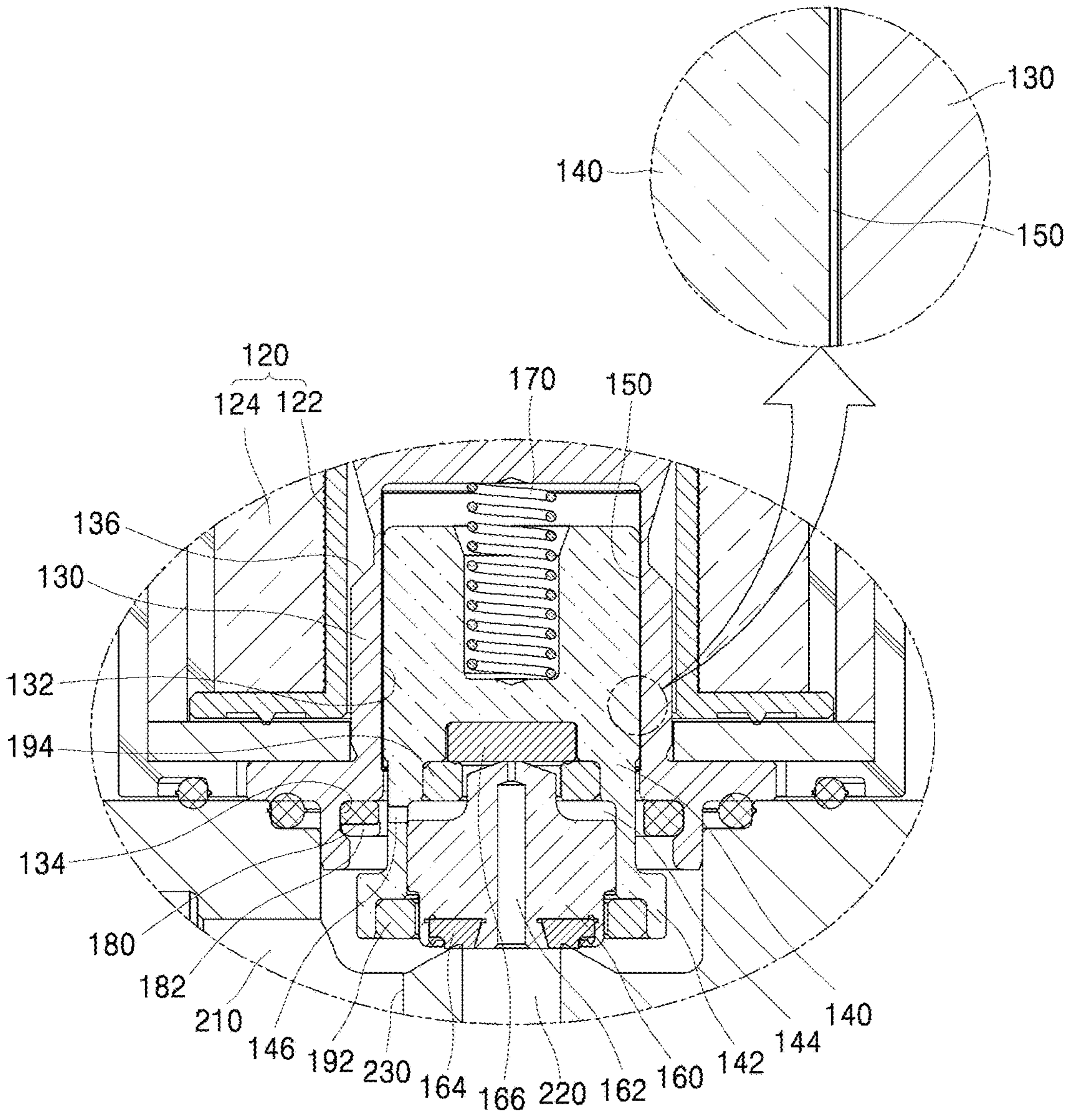

[FIG. 3]
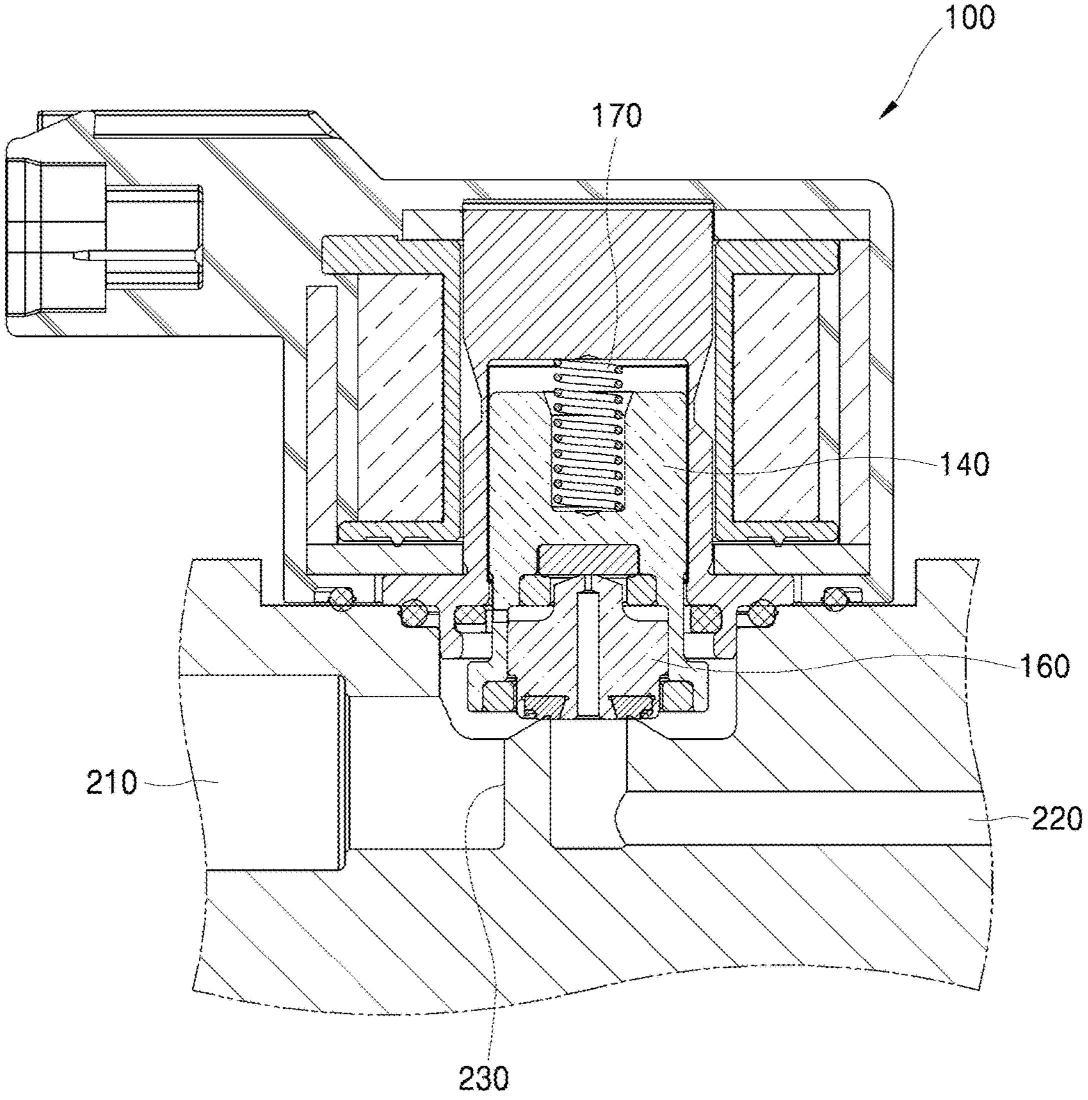

[FIG. 4]
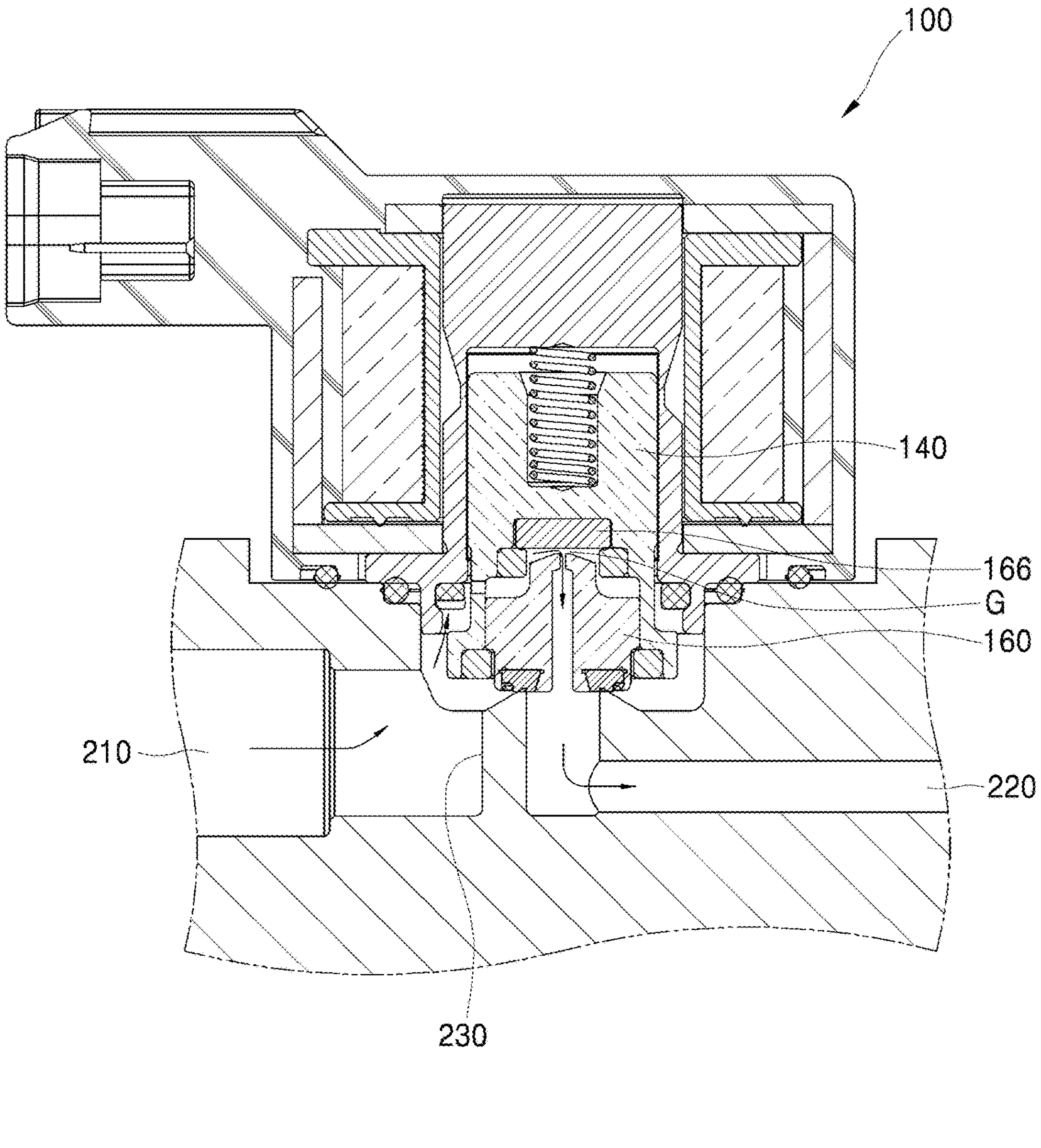

[FIG. 5]
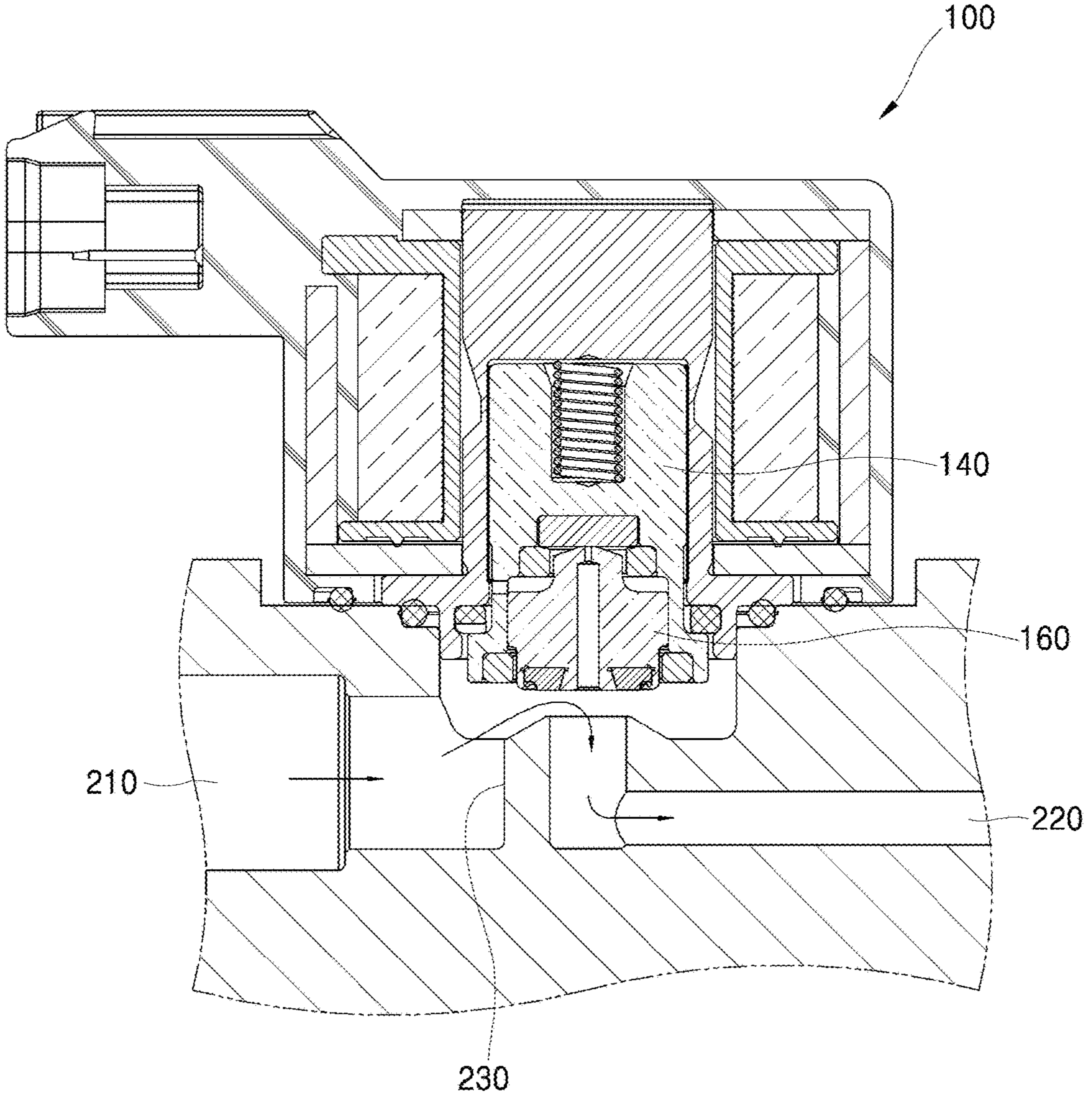

FUEL CUT-OFF VALVE

TECHNICAL FIELD

The present disclosure relates to a fuel cut-off valve, and more particularly, to a fuel cut-off valve with improved opening performance, airtightness performance, and noise performance.

BACKGROUND

In general, a fuel cell system is a system that produces electrical energy by reacting hydrogen and oxygen. Such fuel cell systems are under continuous research and development as an alternative that can solve environmental problems.

A fuel cell electric vehicle (FCEV) is a vehicle that uses a fuel cell in place of an internal combustion engine, and is configured to run by driving a motor with electrical energy generated by the reaction of hydrogen and oxygen.

The fuel cell electric vehicle described above comprises a stack that generates electrical energy, a fuel supply system that supplies hydrogen as fuel, an air supply system that supplies oxygen as an oxidizer necessary for the electrochemical reaction, a system that manages heat and water generated by the stack, and the like.

Of the systems described above, the fuel supply system is provided with a hydrogen tank in which high-pressure hydrogen is stored, and the hydrogen stored in the hydrogen tank is decompressed to a predetermined pressure and supplied to the stack.

Korean Patent No. 10-1893361 (Sep. 4, 2018) discloses a fuel cut-off valve that is installed between a hydrogen tank and a stack and cuts off fuel.

The fuel cut-off valve includes a valve part that regulates fluid and a solenoid part that drives the valve part. Of these, the solenoid part is for controlling the valve part, and includes a coil assembly that generates a magnetic field, a hollow core, a plunger installed movably inside the core, and a plunger absorber provided on the plunger.

However, since the fuel cut-off valve described above has a structure in which the plunger moves while being in contact with the inner wall of the core, there is a problem that when the solenoid part is operated to thereby move the plunger, operating resistance is caused by friction with the core.

SUMMARY

Technical Objectives

The present disclosure is intended to solve the problems of the prior art described above, and it is an object to provide a fuel cut-off valve that can effectively eliminate operating resistance by reducing the friction caused by the contact between a core and a plunger.

Furthermore, it is an object of the present disclosure to provide a fuel cut-off valve that can improve the degree of design freedom in an engine room and solve problems resulting from assembly interference with other parts.

Technical Solutions

A fuel cut-off valve according to the present disclosure is a valve installed in a valve body including a supply path, a discharge path, and a valve seat formed between the supply path and the discharge path, and configured to regulate a flow of fuel by opening and closing the valve seat.

Looking into the configuration, the fuel cut-off valve includes a housing with which a connector for electric power and signal transmission is integrally formed, a coil assembly provided inside the housing and electrically connected to the connector, a core coupled to pass through the coil assembly and having a first operation groove formed therein, a plunger installed movably in the first operation groove and having a second operation groove, which is connected to the supply path, formed therein, a friction member interposed between the core and the plunger and configured to reduce friction, a pilot installed movably in the second operation groove and having a pilot orifice, which connects the second operation groove and the discharge path, formed therein, and a spring interposed between the core and the plunger and configured to elastically support the plunger so that the pilot comes in close contact with the valve seat.

Effects of the Disclosure

The present disclosure, configured as described above, can effectively eliminate the operating resistance of the plunger by reducing the friction caused by contact by interposing the friction member between the core and the plunger, and can thereby improve the opening performance, airtightness performance, and noise performance.

In addition, the present disclosure can minimize the volume of the valve by eliminating the operating resistance of the plunger, and thus, can improve the degree of design freedom in the engine room and solve problems resulting from assembly interference with other parts.

BRIEF DESCRIPTION OF THE DRAWINGS

FIG. 1 is a cross-sectional view of a fuel cut-off valve according to one embodiment of the present disclosure;

FIG. 2 is an enlarged view of a portion of a fuel cut-off valve according to one embodiment of the present disclosure; and FIGS. 3 to 5 are views showing operating states of a fuel cut-off valve according to one embodiment of the present disclosure.

DETAILED DESCRIPTION OF EMBODIMENTS

Preferred embodiments according to the present disclosure will be described in detail with reference to the accompanying drawings. Here, if it is determined that specific descriptions of known technologies related to the present disclosure may unnecessarily obscure the gist of the present disclosure, the detailed descriptions will be omitted. In addition, the same reference numerals in the drawings are used to indicate the same or similar components.

Referring to FIGS. 1 and 2, a fuel cut-off valve 100 according to one embodiment of the present disclosure is a valve that is installed in a valve body 200 in which fuel transporting paths 210 to 220 are formed, and that regulates the flow of fuel.

First, looking into the valve body 200 in which the fuel cut-off valve 100 according to the present embodiment is installed, a supply path 210 is formed on one side of the valve body 200, a discharge path 220 is formed on the other side, and a valve seat 230 is formed between the supply path 210 and the discharge path 220. In this case, the top of the valve body 200 in which the valve seat 230 is formed is open, and the fuel cut-off valve 100 is installed in the open top.

The valve seat 230 is a part that is opened and closed by the fuel cut-off valve 100, and protrudes toward the fuel cut-off valve 100 but has a tapered shape with the diameter decreasing toward the tip.

The fuel cut-off valve 100 consists of a housing 110, a coil assembly 120 provided inside the housing 110, a core 130 passing through the coil assembly 120, a plunger 140 installed movably inside the core 130, a friction member 150 interposed between the core 130 and the plunger 140, a pilot 160 installed movably inside the plunger 140, and a spring 170 elastically supporting the pilot 160.

The housing 110 is of a cylindrical shape with the top sealed and the bottom open. A connector 112 for electric power and signal transmission is formed on one side of the housing 110. In addition, a flange (not shown) for coupling with the valve body 200 is formed at the lower end of the housing 110.

For reference, the fuel cut-off valve 100 is coupled to the valve body 200 via a bolt (not shown) that passes through the flange of the housing 110.

The coil assembly 120 is provided inside the housing 110 and is electrically connected to the connector 112, and generates a magnetic field when electric power is applied via the connector 112.

The coil assembly 120 consists of a bobbin 122 and a coil 124 wound around the outer circumferential surface of the bobbin 122. The bobbin 222 is formed in a hollow spool shape and is made of an insulating material so as to electrically isolate the coil 124 from the core 130. The coil 124 is the part where a magnetic field is generated upon application of electric power, and the strength of the magnetic field generated at this time is proportional to the current flowing along the coil 124 and the number of turns.

The core 130 is a fixed iron core that induces the magnetic field generated by the coil assembly 120. The core 130 extends in one direction (the vertical direction in the drawing) and is coupled so as to pass through the coil assembly 120 from bottom to top.

A first operation groove 132 and 134, which is open downward, is formed in the core 130. The first operation groove 132 and 134 consists of a smaller diameter portion 132 that guides the movement of the plunger 140 and a larger diameter portion 134 that is formed below the smaller diameter portion 132 and is open toward the valve seat 230.

A tapered magnetic enhancement groove 136 for securing magnetic force is formed around the middle part of the core 130 corresponding to the upper end of the smaller diameter portion 132. In addition, the larger diameter portion 134 is provided with a damper 180 for absorbing the shock generated upon contact with the plunger 140.

The damper 180 is made of a material having a predetermined elasticity so as to absorb shocks, and is formed in an annular shape so as to be in close contact with the inner circumferential surface of the larger diameter portion 134. In this case, a number of connecting grooves 182 are formed radially on the lower surface of the damper 180.

The connecting grooves 182 are passageways for connecting the supply path 210 and the first operation groove 132 and 134, and more particularly, allow the supply path 210 and the first operation groove 132 and 134 to remain in a connected state even when the core 130 and the plunger 140 are in contact with each other.

The plunger 140 is a movable iron core that moves by the magnetic field induced through the core 130, and is installed movably in the first operation groove 132 and 134 of the core 130.

The plunger 140 has a cylindrical shape that extends in the vertical direction. A flange 142, which comes in contact with the damper 180 and limits the rise of the plunger 140, is formed at the lower end of the plunger 140. In this case, the flange 142 is formed with a diameter larger than the plunger 140 and smaller than the larger diameter portion 134.

A second operation groove 142 that is open downward is formed in the plunger 140. The second operation groove 142 is connected to the supply path 210, and to this end, a connecting hole 146 is formed around the lower part of the plunger 140 in which the second operation groove 142 is formed.

The friction member 150 is a means for reducing friction caused by contact by being interposed between the core 130 and the plunger 140. The friction member 150 is in the form of a thin film or sheet, and is rolled into a cylindrical shape and attached to the inner wall of the first operation groove 132. This friction member 150 is made of polytetrafluoroethylene (PTFE) or a material containing it, and is preferably made with a thickness of 1.0 mm or less.

In this way, when the friction caused by the contact between the core 130 and the plunger 140 is reduced via the friction member 150, the operating resistance of the plunger 140 can be effectively eliminated, thereby improving the opening performance, airtightness performance, and noise performance.

The pilot 160 is a means that is moved by the pressure of the fuel introduced through the connecting hole 140 and that opens and closes the paths 210 to 220. This pilot 160 is installed movably in the second operation groove 144 of the plunger 140, and closes or opens the paths 210 to 220 when it contacts or moves away from the valve seat 230.

A pilot orifice 162 connecting the second operation groove 144 with the discharge path 220 is formed in the pilot 160. In addition, the pilot 160 is provided with a first absorber 164 that absorbs the shock generated upon contact with the valve seat and at the same time maintains airtightness. In this case, it is preferable that the diameter of the pilot orifice 162 is 0.8 mm or less.

The second operation groove 144 in which the pilot 160 is installed is provided with a second absorber 166 for absorbing the shock generated upon contact with the pilot 160 and at the same time for improving airtightness. In addition, the top inner circumferential surface of the second operation groove 144 is provided with a first stopper 192 for improving airtightness by being press-fitted into the second operation groove 144, and the bottom opening of the second operation groove 144 is coupled with a stopper 194 for preventing separation of the pilot 160.

The spring 170 is interposed between the core 130 and the plunger 140 to thereby elastically support the plunger 140. The plunger 140 supported elastically by the spring 170 biases the pilot 160 downward, causing it to come in close contact with the valve seat 230.

The operating states of the fuel cut-off valve according to the present embodiment will be discussed with reference to FIGS. 3 to 5.

FIG. 3 shows a state in which electric power is not applied to the fuel cut-off valve 100, FIG. 4 shows an initial state in which electric power is applied to the fuel cut-off valve 100, and FIG. 5 shows a later state in which electric power is applied to the fuel cut-off valve 100.

As shown in FIG. 3, in the state in which electric power is not applied, the plunger 140 descends by the elastic force of the spring 170 and moves the pilot 160 downward. At this time, the pilot 160 comes in contact with the valve seat 230 and closes the valve seat 230, thereby cutting off the flow of fuel through the transport paths 210 to 220.

As shown in FIG. 4, at an early stage of electric power application to the fuel cut-off valve 100, the plunger 140 rises slightly, a gap G is formed between the pilot 160 and the second absorber 166, and the fuel in the supply path 210 is transported to the discharge path 220 side through the gap G. At this time, since the pressure on the supply path 210 side is greater than the pressure on the discharge path 220 side, the pilot 160 remains in contact with the valve seat 230.

On the other hand, at a later stage of electric power application to the fuel cut-off valve 100, the plunger 140 rises completely, moving the pilot 160 away from the valve seat 230. Therefore, the valve seat 230 is opened, allowing the flow of fuel through the transport paths 210 to 220.

The present disclosure has been described with reference to the illustrated drawings as above, but the present disclosure is not limited by the embodiments and drawings disclosed herein, and it is clear that various modifications can be made by those having ordinary skill in the art within the scope of the technical idea of the present disclosure. In addition, even if the effects according to the configuration of the present disclosure were not explicitly described while describing the embodiments of the present disclosure above, it is obvious that the effects that can be anticipated by the corresponding configuration should also be recognized.

The invention claimed is:

1. A fuel cut-off valve installed in a valve body including a supply path, a discharge path, and a valve seat formed between the supply path and the discharge path, and configured to regulate a flow of fuel by opening and closing the valve seat, comprising:

a housing with which a connector for electric power and signal transmission is integrally formed;

a coil assembly provided inside the housing and electrically connected to the connector;

a core coupled to pass through the coil assembly and having a first operation groove formed therein;

a plunger installed movably in the first operation groove and having a second operation groove, which is connected to the supply path, formed therein;

a friction member interposed between the core and the plunger and configured to reduce friction;

a pilot installed movably in the second operation groove and having a pilot orifice, which connects the second operation groove and the discharge path, formed therein; and a spring interposed between the core and the plunger and configured to elastically support the plunger so that the pilot comes in close contact with the valve seat, wherein the first operation groove comprises a smaller diameter portion configured to guide movement of the plunger, and a larger diameter portion that is formed below the smaller diameter portion and is open toward the valve seat, and the larger diameter portion is provided with a damper for absorbing a shock generated upon contact with the plunger, and wherein a connecting groove, which connects the supply path and the first operation groove even when the core and the plunger are in contact, is formed in the damper.

2. The fuel cut-off valve of claim 1, wherein a connecting hole, which connects the supply path and the second operation groove, is formed in the plunger.

3. The fuel cut-off valve of claim 2, wherein a flange configured to come in contact with the damper is formed at one end of the plunger, and the flange is formed with a diameter smaller than the larger diameter portion.

4. The fuel cut-off valve of claim 1, wherein the pilot is provided with a first absorber configured to absorb a shock generated upon contact with the valve seat and maintain airtightness at the same time.

5. The fuel cut-off valve of claim 1, wherein the second operation groove is provided with a second absorber configured to absorb a shock generated upon contact with the pilot and maintain airtightness at the same time.

6. The fuel cut-off valve of claim 1, wherein the friction member has a thickness of 1.0 mm or less to be attached to an inner wall of the first operation groove.

7. The fuel cut-off valve of claim 6, wherein the friction member is a film of polytetrafluoroethylene (PTFE) or a material containing polytetrafluoroethylene (PTFE).

8. The fuel cut-off valve of claim 1, wherein the pilot orifice has a diameter of 0.8 mm or less.

* * * * *